United States Patent [19]

Sherwood, Jr. et al.

[11] Patent Number: 5,094,994
[45] Date of Patent: Mar. 10, 1992

[54] CATALYST COMPOSITION FOR HYDROPROCESSING PETROLEUM FEEDSTOCKS

[75] Inventors: David E. Sherwood, Jr.; Burton H. Bartley; Laurence D. Neff; Pei-Shing E. Dai, all of Port Arthur, Tex.

[73] Assignee: Texaco Inc., White Plains, N.Y.

[21] Appl. No.: 645,772

[22] Filed: Jan. 25, 1991

Related U.S. Application Data

[62] Division of Ser. No. 194,379, May 13, 1988.

[51] Int. Cl.$^5$ .................... B01J 21/04; B01J 23/88
[52] U.S. Cl. ................................................. 502/314
[58] Field of Search .......................... 502/314

[56] References Cited

U.S. PATENT DOCUMENTS

| | | | |
|---|---|---|---|
| 4,082,695 | 4/1978 | Rosinski et al. | 502/314 X |
| 4,341,625 | 7/1982 | Tamm | 502/314 X |
| 4,357,263 | 11/1982 | Heck et al. | 208/216 PP |
| 4,404,097 | 9/1983 | Angevine et al. | 208/251 H |

OTHER PUBLICATIONS

Above References C and D were cited in Parent Application Ser. No. 07/194,379.

Primary Examiner—W. J. Shine
Attorney, Agent, or Firm—Robert A. Kulason; James J. O'Loughlin; Carl G. Seutter

[57] ABSTRACT

A catalyst composition useful in the hydroprocessing of a sulfur- and metal-containing hydrocarbon feedstock comprises 1.0–5.0 weight percent of an oxide of nickel or cobalt and 10.0–25.0 weight percent of an oxide of molybdenum, all supported on a porous alumina support in such a manner that the molybdenum gradient of the catalyst has a value of less than 6.0 and 15–30% of the nickel or cobalt contained in the catalyst is in an acid extractable form. The catalyst is further characterized by having a total surface area of 150–210 m$^2$/g, a total pore volume of 0.50–0.75 cc/g, and a pore size distribution such that pores having diameters of less than 100A constitute less than 25.0%, pores having diameters of 100–160A constitute 70.0–85.0% and pores having diameters of greater than 250A constitute 1.0–15.0% of the total pore volume of the catalyst. A method for the hydroprocessing of a sulfur- and metal-containing hydrocarbon feedstock comprises contacting the feedstock with the abovedescribed catalyst and hydrogen in a manner such that the catalyst is maintained at isothermal conditions and is exposed to a uniform quality of feed. The method is particularly effective in achieving desired levels of hydrodesulfurization in vacuum residual feedstocks.

6 Claims, No Drawings

CATALYST COMPOSITION FOR HYDROPROCESSING PETROLEUM FEEDSTOCKS

This is a division of application Ser. No. 07/194,379, filed May 13, 1988.

BACKGROUND OF THE INVENTION

1. Field of the Invention

This invention relates to a catalyst composition useful in the hydroprocessing of a sulfur- and metal-containing hydrocarbon feedstock, and to a method for the catalytic hydroprocessing of a sulfur- and metal-containing hydrocarbon feedstock employing such a catalyst composition. More particularly, this invention relates to a catalyst composition comprising a specified amount of an oxide of nickel or cobalt and a specified amount of an oxide of molybdenum, the catalyst further characterized by having a specified pore size distribution, a specified molybdenum gradient from the interior to the exterior of a given catalyst pellet and a specified percentage of the nickel or cobalt in acid extractable form. This invention also relates to a method for hydroprocessing a sulfur- and metal-containing hydrocarbon feedstock which comprises contacting the feedstock with hydrogen and the abovedescribed catalyst in such a manner that the catalyst is maintained at isothermal conditions and is exposed to a uniform quality of feed.

2. Information Disclosure Statement

Co-assigned U.S. patent application Ser. No. 168,095, filed Mar. 14, 1988, now U.S. Pat. No. 4,941,964, incorporated herein by reference, discloses a process for the hydrotreatment of a sulfur and metal-containing hydrocarbon feed which comprises contacting the feed with hydrogen and a catalyst in a manner such that the catalyst is maintained at isothermal conditions and is exposed to a uniform quality of feed. The catalyst has a composition comprising 3.0–5.0 wt. % of an oxide of a Group VIII metal, 14.5–24.0 wt. % of an oxide of a Group VIB metal and 0–2.0 wt. % of an oxide of phosphorus supported on a porous alumina support, and the catalyst is further characterized by having a total surface area of 150–210 m$^2$/g and a total pore volume (TPV) of 0.50–0.75 cc/g with a pore diameter distribution such that micropores having diameters of 100–160A constitute 70–85% of the total pore volume of the catalyst and macropores having diameters of greater than 250A constitute 5.5–22.0% of the total pore volume of the catalyst.

U.S. Pat. No. 4,670,132 (Arias et al.) discloses a catalyst preparation and a catalyst composition useful in the hydroconversion of heavy oils, the catalyst comprising a high iron content bauxite with the addition of one or more of the following promoters: phosphorus, molybdenum, cobalt, nickel or tungsten. The bauxite catalysts typically contain 25–35 wt % aluminum. The catalysts have certain characteristic features for the elemental components (including aluminum and where present, molybdenum) when the pellet exteriors are examined in the fresh oxide state using X-ray photoelectron spectroscopy (XPS). For those catalysts which contain molybdenum, the surface Mo/Al atomic ratios on the pellet exteriors are in the range of 0.03 to 0.09. Arias is distinguished from the instant invention in that its catalyst requires a bauxite support whereas the catalyst of the instant invention does not. In addition, Arias requires a surface Mo/Al atomic ratio on the pellet exteriors in the range of 0.03 to 0.09 when the fresh oxide catalyst is examined by XPS whereas the catalysts of the instant invention are characterized by: (1) bulk Mo/Al atomic ratios of 0.06–0.075 as measured by traditional techniques; (2) surface Mo/Al atomic ratios on the pellet exteriors of 0.20–0.55 as measured by XPS on the fresh oxide catalysts; (3) surface Mo/Al atomic ratios on the crushed catalyst pellets of 0.10–0.15 as measured by XPS on the fresh crushed oxide catalysts, and, (4) that the ratio of the surface Mo/Al atomic ratios of the pellet exteriors relative to the surface Mo/Al atomic ratios of the crushed catalyst pellets be less than 6.0.

U.S. Pat. No. 4,652,545 (Lindsley et al.), incorporated herein by reference, discloses a catalyst composition useful in the hydroconversion of heavy oils, the catalyst containing 0.5–5% Ni or Co and 1.8–18% Mo (calculated as the oxides) on a porous alumina support, having 15–30% of the Ni or Co in an acid extractable form, and further characterized by having a TPV of 0.5–1.5 cc/g with a pore diameter distribution such that (i) at least 70% TPV is in pores having 80–120A diameters, (ii) less than 0.03 cc/g of TPV (6% TPV) is in pores having diameters of less than 80A, and (iii) 0.05–0.1 cc/g of TPV (3–20% TPV) is in pores having diameters of greater than 120A. Lindsley et al. is distinguished from the instant invention in that although it teaches that having a proportion of nickel or cobalt contained in its catalyst in an acid extractable form is advantageous in terms of heavy oil hydroconversion, Lindsley et al. does not teach or suggest that catalysts which have a prescribed molybdenum gradient are advantageous in terms of heavy oil hydroconversion.

U.S. Pat. No. 4,588,709 (Morales et al.) discloses a catalyst preparation and a catalyst composition useful in the hydroconversion of heavy oils, the catalyst comprising 5–30 wt % of a Group VIB element (e.g. molybdenum) and 1–5 wt % of a Group VIII element (e.g. nickel) Morales et al. indicate that the finished catalysts have average pore diameters of 150 to 300 Angstroms. The catalysts have certain characteristic features for the active components (Mo and Ni) when the pellet exteriors are examined in a sulfided state using X-ray photoelectron spectroscopy (XPS). Morales ('709) is distinguished from the instant invention in that its catalyst requires a large average pore diameter (150 to 300 Angstroms) whereas the catalyst of the instant invention has median pore diameters of 120 to 130 Angstroms. In addition, Morales ('709) requires certain characteristic XPS features of the pellet exteriors after presulfiding whereas the catalyst of the instant invention requires a specified molybdenum gradient as determined by measuring the molybdenum/aluminum atomic ratios by XPS for the catalyst pellet exteriors and the pellets in a crushed form as measured on the fresh catalysts in an oxide state.

U.S. Pat. No. 4,579,649 (Morales et al.) discloses a catalyst preparation and a catalyst composition useful in the hydroconversion of heavy oils, the catalyst containing a Group VIB element (e.g. molybdenum), a Group VIII element (e.g. nickel) and phosphorus oxide on a porous alumina support. The catalyst has certain characteristic features for the three active components (Mo, Ni and P) when the pellet exteriors are examined in a sulfided state using X-ray photoelectron spectroscopy (XPS). Morales ('649) is distinguished from the instant invention in that its catalyst requires phosphorus whereas the catalyst of the instant invention does not. In addition, Morales ('649) requires certain characteristic XPS features of the pellet exteriors after presulfiding whereas the catalysts of the instant invention require a specified molybdenum gradient as determined by measuring the molybdenum/aluminum atomic ratios by XPS for the catalyst pellet exteriors and the pellets in a crushed form as measured on the fresh catalysts in an oxide state.

U.S. Pat. No. 4,520,128 (Morales et al.) discloses a catalyst preparation and a catalyst composition useful in the hydroconversion of heavy oils, the catalyst containing 5–30 wt % of a Group VIB element (e.g. molybdenum), 0.1–8.0 wt % of a Group VIII element (e.g. nickel) and 5–30 wt % of a phosphorus oxide on a porous alumina support. The finished catalysts of Morales ('128) have mean pore diameters of 145 to 154 Angstroms. The catalyst has certain characteristic features for the three active components (Mo, Ni and P) when the pellet exteriors are examined in a sulfided state using X-ray photoelectron spectroscopy (XPS). Morales ('128) is distinguished from the instant invention in that its catalyst requires phosphorus whereas the catalyst of the instant invention does not. Morales ('128) also requires a large mean pore diameter (145 to 154 Angstroms) whereas the catalyst of the instant invention has median pore diameters of 120 to 130 Angstroms. In addition, Morales ('128) requires certain characteristic XPS features of the pellet exteriors after presulfiding whereas the catalysts of the instant invention require a specified molybdem gradient as determined by measuring the molybdenum/aluminum atomic ratios by XPS for the catalyst pellet exteriors and the pellets in a crushed form as measured on the fresh catalysts in an oxide state.

SUMMARY OF THE INVENTION

The instant invention is a catalyst composition useful in the hydroprocessing of a sulfur- and metal-containing hydrocarbon feedstock, and a method for the catalytic hydroprocessing of such a feedstock. The catalyst composition of the instant invention comprises 1.0–5.0, preferably 2.5–3.5 wt. % of an oxide of nickel or cobalt, preferably NiO, and 10.0–25.0, preferably 12.0–18.0 wt. % of an oxide of molybdenum, preferably $MoO_3$, all supported on a porous alumina support, preferably a gamma-alumina support, in such a manner that the molybdenum gradient (as herein defined) of the catalyst has a value of less than 6.0, preferably 1.5–5.0, and 15–30% of the nickel or cobalt contained in the catalyst is in an acid extractable form. The catalyst composition is further characterized by having a total surface area of 150–210, preferably 170–205 $m^2/g$, a total pore volume (TPV) of 0.50–0.75, preferably 0.60–0.70 cc/g, a mean pore diameter of 120–130Å, and a pore size distribution such that pores having diameters less than 100Å constitute less than 25.0%, preferably 5.0–20.0%, most preferably 9.0–17.0%, pores having diameters of 100–160Å constitute 70.0–85.0%, preferably 70.0–80.0%, and pores having diameters of greater than 250Å constitute 1.0–15.0 %, preferably 4.0–14.0 % of the catalyst TPV.

The method of the instant invention comprises contacting the abovedescribed catalyst with hydrogen and a sulfur- and metal-containing hydrocarbon feedstock by any means which insures that the catalyst is maintained at isothermal conditions and exposed to a uniform quality of feed. Preferred means for achieving such contact include contacting the feed with hydrogen and the prescribed catalyst in a single continuous stirred tank reactor or single ebullated bed reactor, or in a series of 2–5 continuous stired tank or ebullated bed reactors, with ebullated bed reactors being particularly preferred The method of the instant invention is particularly effective in achieving desired levels of hydrodesulfurization with vacuum residua feedstocks.

DETAILED EMBODIMENTS OF THE INVENTION

It is one object of this invention to provide a catalyst composition useful in the hydroprocessing of a sulfur- and metal-containing hydrocarbon feedstock. It is another object of this invention to provide a method for the catalytic hydroprocessing of a sulfur- and metal-containing hydrocarbon feedstock which employs such a catalyst.

It is one feature of the catalyst composition of the instant invention that it has a specified molybdenum gradient (as herein defined) from the interior to the exterior of a given catalyst pellet. It is another feature of the catalyst composition that 15–30% of the nickel or cobalt contained in the catalyst is in an acid extractable form. It is yet another feature of the catalyst composition that it has a specified pore size distribution such that pores having diameters less than 100Å constitute less than 25.0%, pores having diameters of 100–160Å constitute 70.0–85.0 %, and pores having diameters of greater than 250Å constitute 1.0–15.0 % of the total pore volume of the catalyst. It is a feature of the method of the instant invention that the abovedescribed catalyst is contacted with a hydrocarbon feedstock and hydrogen in such a manner as to expose the catalyst to a uniform quality of feed, and to maintain the catalyst at isothermal temperatures.

The catalyst of the instant invention is advantageous in that it has a high activity for hydroprocessing heavy hydrocarbon feedstocks, including vacuum residua. The method of the instant invention is advantageous in that it enables the attainment of improved levels of hydrodesulfurization when hydroprocessing heavy feedstocks such as vacuum residua.

This invention is directed to a catalyst composition and method for the catalytic hydroprocessing of a hydrocarbon feedstock, preferably a petroleum feedstock. As used in this description and in the appended claims, the term "hydroprocessing" comprises the hydrodesulfurization (HDS), hydrodenitrogenation (HDN), and hydrodemetalation (HDM) (particularly including removal of nickel compounds (HDNi) and vanadium compounds (HDV)) of a hydrocarbon feedstock, particularly petroleum feedstocks. Petroleum feedstocks which may be treated by the catalyst and process of the instant invention include naphthas, distillates, gas oils, petroleum cokes, residual oils, and vacuum residua. A petroleum feedstock typical of those subject to catalytic hydroprocessing by the catalyst and process of the instant invention is an Arabian Medium/Heavy Vacuum Resid feedstock as set forth in Table I, below.

TABLE I

| Typical Petroleum Feedstock (Arabian Medium/Heavy Vacuum Resid) | |
|---|---|
| API Gravity | 4.8 |
| 1000° F.+, vol % | 87.5 |
| 1000° F.+, wt % | 88.5 |
| Sulfur, wt % | 5.0 |
| Total Nitrogen, wppm | 4480 |
| Hydrogen, wt % | 10.27 |
| Carbon, wt % | 84.26 |

TABLE I-continued

Typical Petroleum Feedstock
(Arabian Medium/Heavy Vacuum Resid)

| | |
|---|---|
| Alcor MCR, wt % | 22.2 |
| Kinematic Viscosity, cSt | |
| @ 212° F. | 2430 |
| @ 250° F. | 410 |
| @ 300° F. | 117 |
| Pour Point, °F. | 110 |
| n-$C_5$ Insolubles, wt % | 28.4 |
| n-$C_7$ Insolubles, wt % | 9.96 |
| Toluene Insolubles, wt % | 0.02 |
| Asphaltenes, wt % | 9.94 |
| Metals, wppm | |
| Ni | 49 |
| V | 134 |
| Fe | 10 |
| Cu | 3 |
| Na | 49 |
| Chloride, wppm | 28 |

The catalyst composition of the instant invention comprises 1.0-5.0, preferably 2.5-3.5 wt. % of an oxide of nickel or cobalt, preferably NiO and 10.0-25.0, preferably 12.0-18.0 wt. % of an oxide of molybdenum, most preferably $MoO_3$, all supported on a porous alumina support, most preferably a gamma-alumina support. Other oxide compounds which may be found in such a catalyst composition include $SiO_2$ (present in less than 2.5 wt. %), $SO_4$ (present in less than 0.8 wt. %), and $Na_2O$ (present in less than 0.1 wt. %). The abovedescribed alumina support may be purchased or prepared by methods well known to those skilled in the art. Similarly, the support material may be impregnated with the requisite amounts of the abovedescribed oxides of nickel, cobalt, and molybdenum via conventional means known to those skilled in the art. The catalyst composition of the instant invention contains no bauxite and thus is distinguishable from bauxite-containing catalysts such as those described in U.S. Pat. No. 4,670,132.

A first necessary and essential feature of the catalyst composition of the instant invention is that 15-30% of the nickel or cobalt present in the catalyst (relative to the total nickel or cobalt present in the catalyst) be acid extractable. As taught at Column 3, lines 7-35 of U.S. Pat. No. 4,652,545, it is the final calcination temperature during preparation of the catalyst which determines the percentage of free nickel oxide or cobalt oxide (which is acid extractable) in the total catalyst composition. Combined nickel or cobalt is not readily acid extractable. As taught at Column 3, lines 36-40 of U.S. Pat. No. 4,652,545, it is theorized that the abovedescribed low proportion of acid extractable nickel or cobalt prevents the catalyst from being deactivated almost immediately with respect to its hydroconversion activity.

A second necessary and essential feature of the catalyst composition of the instant invention is the specified pore size distribution of the catalyst. It is well known to those skilled in the art that the activity of a given catalyst is proportional to its surface area and active site density. Ordinarily, a catalyst with a large proportion of micropores (defined herein as pores with diameters less than 250A) will have a higher surface area and a corresponding higher intrinsic activity, whereas a catalyst having a large proportion of macropores (defined herein as pores with diameters greater than 250A) will have a lower surface area and a corresponding lower intrinsic activity However, when hydroprocessing certain hydrocarbon feedstocks such as petroleum feedstocks, particularly vacuum residua, the observed catalyst reaction rates for catalysts with a large proportion of small diameter pores are low due to diffusional limitations of the small pores, as well as pore blockage caused by accumulating carbon and metals as the catalyst ages.

The incorporation of large amounts of macroporosity into catalysts somewhat alleviates the problems of diffusional limitations and pore blockage However, with large amounts of macroporosity other problems often result when such catalysts are employed in hydroprocessing of petroleum feedstocks such as vacuum residua. For example, larger pores provide better access to the catalyst interior and therefore a higher probability of metal-containing and/or high molecular weight compounds poisoning the catalyst, thereby reducing the catalyst activity.

It is evident that the abovedescribed conflicting demands placed upon petroleum feedstock hydroprocessing catalyst compositions make it difficult to employ a single catalyst in hydroprocessing. However, the catalyst of the instant invention may be employed as a single catalyst in hydroprocessing as the prescribed catalyst has a limited macroporosity sufficient to overcome the diffusion limitations for hydroprocessing of the largest molecules but not so much as to allow poisoning of the catalyst pellet interiors. The catalyst of the instant invention is characterized by having a total surface area of 150-210 $m^2/g$, preferably 170-205 $m^2/g$, and a TPV of 0.50-0.75 cc/g, preferably 0 60-0.70 $m^2/g$, with a pore size distribution such that micropores having diameters of 100-160A constitute 70-85%, preferably 70-80% TPV of the catalyst, and macropores having diameters of greater than 250A constitute 1.0-15.0%, preferably 4.0-14.0% TPV of the catalyst. In such a catalyst, it is particularly preferred that the pore volume of micropores having diameters less than 100A be limited to less than 25.0% TPV, preferably 5.0-20.0% TPV, most preferably 9.0-17.0% TPV of the catalyst. The catalyst of the instant invention has a median pore diameter of 120-130A, and thus is distinguishable from larger average micropore diameter catalysts such as those disclosed in U.S. Pat. Nos. 4,588,709 and 4,520,128.

A third necessary and essential feature of the catalyst composition of the instant invention is that the abovedescribed oxide of molybdenum, preferably $MoO_3$, is distributed on the abovedescribed porous alumina support in such a manner that the molybdenum gradient of the catalyst has a value of less than 6.0. As used in this description and in the appended claims, the phrase "molybdenum gradient" means that the ratio of a given catalyst pellet exterior molybdenum/aluminum atomic ratio to a given catalyst pellet interior molybdenum/aluminum atomic ratio has a value of less than 6.0, preferably 1.5-5.0, the atomic ratios being measured by X-ray photoelectron spectroscopy (XPS), sometimes referred to as Electron Spectroscopy for Chemical Analysis (ESCA). It is theorized that the molybdenum gradient is strongly affected by the impregnation of molybdenum on the catalyst support and the subsequent drying of the catalyst during its preparation. ESCA data on both catalyst pellet exteriors and interiors were obtained on an ESCALAB MKII instrument available from V. G. Scientific Ltd., which uses a 1253.6 electron volt magnesium X-ray source. Atomic percentage values were calculated from the peak areas of the molybdenum $3p_{3/2}$ and aluminum $2p_{3/2, 1/2}$ signals using the sensitivity factors supplied by V. G. Scientific Ltd. The value of 74.7 electron volts for aluminum was used as a reference binding energy.

To determine the molybdenum/aluminum atomic ratio of a given catalyst pellet exterior for the catalyst of the instant invention, the catalyst pellets were stacked flat, on a sample holder, and subjected to ESCA analysis. For the catalyst of the instant invention, the molybdenum/aluminum atomic ratio of the catalyst pellet exterior is in the range of 0.20–0.55, preferably 0.20–0.52. This exterior molybdenum/aluminum atomic ratio is considerably greater than the Mo/Al catalyst surface atomic ratio of 0.03–0.09 disclosed in U.S. Pat. No. 4,670,132.

To determine the molybdenum/aluminum atomic ratio of a given catalyst pellet interior for the catalyst of the instant invention, the catalyst pellets were crushed into a powder, placed firmly in a sample holder, and subjected to ESCA analysis. For the catalyst of the instant invention, the molybdenum/aluminum atomic ratio of the catalyst pellet interior (i.e. the molybdenum/aluminum ratio of the powder, which is assumed to be representative of the interior portion of the pellet) is in the range of 0.10–0.15, preferably 0.11–0.12.

The molybdenum/aluminum atomic ratios of the total catalyst composition of the instant invention, as determined by conventional means (i.e. Atomic Absorption (AA) or Inductively Coupled Plasma (ICP) spectroscopies) is in the range of 0.060–0.075, preferably 0.062–0.071. To determine the total catalyst composition molybdenum/aluminum atomic ratio, catalyst pellets were ground to a powder and digested in acid to form an ionic solution. The solution was then measured by AA or ICP to determine Mo ion concentration, which was then adjusted to $MoO_3$ concentration. Alumina ) concentration was back-calculated from the direct measurement of the concentrations of the other components (e.g. Ni, Fe, Na, S).

Another feature of the catalyst composition of the instant invention is that the ratio of the measured hydrodesulfurization (HDS) microactivity rate constant k of the catalyst of the instant invention to the measured HDS microactivity rate constant k of a standard hydroprocessing catalyst (namely, American Cyanamid HDS-1443B, a commercially available, state-of-the-art catalyst for use in hydroprocessing resid oils), must have a value of greater than 1.0, preferably greater than 1.5. As used in this description, the phrase "HDS microactivity" means the intrinsic hydrodesulfurization activity of a catalyst in the absence of diffusion, as measured according to the HDS Microactivity (HDS-MAT) Test, described as follows. In the HDS-MAT Test, a given catalyst is ground to a 30–60 mesh fraction and presulfided at 750° F. with a gas stream containing 10% $H_2S$/90% $H_2$. The catalyst is then exposed to a sulfur-containing feed, namely benzothiophene, which acts as a model sulfur compound probe, at reaction temperature and with flowing hydrogen for approximately 4 hours. Samples are taken periodically and analyzed by gas chromatography for the conversion of benzothiophene to ethylbenzene, thereby indicating the hydrodesulfurization properties of the catalyst being tested. The activity is calculated on both a catalyst weight and catalyst volume basis to account for any density differences between catalysts. The conditions for a typical HDS-MAT are as follows:

Temperature: 550° F.
Pressure: Atmospheric
Charge Stock: 0.857 M Benzothiophene in N-Heptane (3.68 wt.% sulfur)
Space Velocity: 4 hr$^{-1}$
Catalyst Charge: 0.5 g The kinetics of the reactor used in the HDS-MAT are first order, plug flow. At the abovestated temperature and space velocity, the rate constant k may be expressed as $$k = ln(1/1 - HDS)$$

where HDS is the fractional hydrodesulfurization value obtained for a given catalyst at the abovestated conditions. A commercially available, state-of-the-art catalyst sold for use in hydroprocessing resid oils (American Cyanamid HDS-1443B catalyst) was evaluated with the HDS-MAT Test under the abovestated conditions. This catalyst was found to have a % HDS value of 73% on a weight basis and a corresponding rate constant k value of 1.3093.

A necessary and essential feature of the hydroprocessing method of the instant invention is that the abovedescribed catalyst must be contacted with the hydrocarbon feed in such a manner as to insure that the catalyst particles are maintained at isothermal conditions and exposed to a uniform quality of feed. Thus, process configurations such as fixed and moving catalyst bed arrangements are specifically precluded, as such reactor bed arrangements fail to insure the necessary isothermal conditions and exposure to a uniform quality of feed. Preferred means for achieving such isothermal conditions and exposure of catalyst to a uniform quality of feed include contacting the feed with catalyst in a single continuous stirred tank reactor (CSTR), a single ebullated bed reactor, or in a series of 2–5 CSTR's or ebullated bed reactors, with ebullated bed reactors being particularly preferred In one particularly preferred embodiment of the method of the instant invention, a sulfur- and metal-containing hydrocarbon feedstock is catalytically hydroprocessed with the abovedescribed catalyst using the H-OIL process configuration. H-OIL is a proprietary ebullated bed process (co-owned by Hydrocarbon Research, Inc. and Texaco Development Corp.) for the catalytic hydrogenation of residua and heavy oils to produce upgraded distillate petroleum products. The ebullated bed system operates under essentially isothermal conditions and allows for exposure of catalyst particles to a uniform quality of feed.

The catalyst and method of the instant invention are particularly effective in achieving desired levels of hydrodesulfurization in vacuum residua feedstocks. One method of evaluating a given catalyst's activity in terms of residua hydrodesulfurization involves the use of a Berty Reactor loaded with the catalyst to be evaluated. In the Berty Reactor, reactions take place in a diffusion controlled regime. Catalyst activity is determined at four space velocities and a reaction rate constant at each space velocity is calculated. The reaction order over the four space velocities is also calculated. The four rate constants are then adjusted to a constant temperature and catalyst volume basis and refit using a second order CSTR model. A final temperature and volume adjusted rate constant is then calculated and this is the activity designation used for catalyst comparison. Typical Berty Reactor Run Conditions are as follows:

Temperature: 805° F.
Pressure: 1000 psig

Charge stock: Arab Med/Hvy (65/35) Vac Resid (diluted 25% Vac Resid/75% Vac Gas Oil)
Feedstock Properties: 1.4 wt % Sulfur 34 wppm Vanadium 10 wppm Nickel
Space Velocities 2.40 hr$^{-1}$ 1.32 hr$^{-1}$ 0.84 hr$^{-1}$ 0.58 hr$^{-1}$
Catalyst Charge: 39.6g Table II, as set forth below, compares four catalysts (Catalysts A, B, C, D) in terms of their physical properties and their Berty Reactor hydrodesulfurization properties. Catalysts B, C, and D, are catalysts of the instant invention.

TABLE II

| Catalyst Comparative Test Results | | | | |
|---|---|---|---|---|
| | Catalyst A | Catalyst B | Catalyst C | Catalyst D |
| NiO$_3$, wt. % | 3.4 | 2.6 | 3.1 | 3.3 |
| MoO$_3$, wt. % | 17.0 | 12.9 | 14.7 | 14.1 |
| Surface Area, m$^2$/g | 171 | 186 | 184 | 188 |
| % TPV 100-160A | 74 | 75 | 73 | 73 |
| % TPV >250A | 8.3 | 6.3 | 7.6 | 7.6 |
| % TPV <100A | 15 | 13 | 17 | 15 |
| Ni Extraction (% of Promoter Ni) | 16.3 | unavailable | 27.6 | 19.9 |
| HDS-MAT Test* | 1.5 | 1.6 | 1.8 | 1.6 |
| Molybdenum Gradient** | 7.7 | 2.3 | 2.6 | 4.9 |
| Berty Reactor HDS*** | 0.9 | 1.6 | 1.7 | 1.7 |

*k measured/k standard (HDS-1443B)
**(Mo/Al)$_{exterior}$/(Mo/Al)$_{crushed}$ (ratios measured by ESCA)
***k measured/k standard (HDS-1443B)

As illustrated by Table II, Catalysts A, B, C, and D have comparable pore structures, surface areas, and metals loadings (i.e. NiO$_3$ and MoO$_3$ concentrations). In addition, all four catalysts have HDS-MAT Test values greater than 1.0. However, Catalyst A has a measured molybdenum gradient value of 7.7, whereas Catalysts B, C and D have molybdenum gradient values between 2.0-5.0. It also should be noted that Catalysts A, C, and D have nickel acid extraction values in the range of 15-30 wt %. Thus, according to the teachings of U.S. Pat. No. 4,652,545, Catalysts A, C, and D should behave approximately the same in terms of hydrodesulfurization of a vacuum residua feedstock.

However, a comparison of the Berty Reactor HDS values given in Table II indicates that Catalyst A did not perform as well as the standard catalyst (i.e. the ratio of its rate constant to the rate constant of the standard catalyst is less than 1.0) whereas Catalysts B, C, and D (which are catalysts of the instant invention) performed better than Catalyst A in terms of rate constant (i.e. the ratios of their rate constants to the rate constant of the standard catalyst are greater than 1.0). Table II thus demonstrates that even when a given catalyst has a nickel acid extraction value in the range of 15-30 wt % in accordance with the teachings of U.S. Pat. No. 4,652,545, it is necessary for the catalyst to have a pore size distribution and molybdenum gradient as prescribed by the instant invention to achieve maximum hydrodesulfurization of a vacuum residua feedstock.

Although this invention has been illustrated by reference to specific embodiments, it will be apparent to those skilled in the art that various changes and modifications may be made which clearly fall within the scope of this invention.

The invention claimed is:

1. A catalyst composition useful in the hydroprocessing of a sulfur- and metal-containing hydrocarbon feedstock comprising 1.0-5.0 weight percent of an oxide of nickel or cobalt and 10.0-25.0 weight percent of an oxide of molybdenum, all supported on a porous alumina support in such a manner that the molybdenum gradient of the catalyst has a value of less than 6.0, 15-30% of the nickel or cobalt is in an acid extractable form, and said catalyst is further characterized by having a total surface area of 150-210 m$^2$/g, a total pore volume of 0.50-0.75 cc/g, and a pore size distribution such that pores having diameters of less than 100A constitute less than 25.0%, pores having diameters of 100-160A constitute 70.0-85.0% and pores having diameters of greater than 250A constitute 1.0-15.0% of the total pore volume of said catalyst.

2. A catalyst composition according to claim 1, where said catalyst comprises 2.5-3.5 weight percent NiO and 12.0-18.0 weight percent MoO$_3$ supported on a porous alumina support.

3. A catalyst composition according to claim 1, where said molybdenum gradient has a value of 1.5-5.0.

4. A catalyst composition according to claim 1, where said catalyst has a total surface area of 170-205m$^2$/g, a total pore volume of 0.60-0.70 cc/g, and a pore size distribution such that pores having diameters of less than 100A constitute 5.0-20.0%, pores having diameters of 100-160A constitute 70.0-80.0% and pores having diameters of greater than 250A constitute 4.0-14.0% of the total pore volume of said catalyst.

5. A catalyst composition according to claim 4, where pores having diameters of less than 100A constitute 9.0-17.0% of the total pore volume of said catalyst.

6. A catalyst composition useful in the hydroprocessing of a sulfur- and metal-containing hydrocarbon feedstock comprising 2.5-3.5 weight percent NiO and 12.0-18.0 weight percent MoO$_3$, all supported on a porous alumina support in such a manner that the molybdenum gradient of the catalyst has a value of 1.5-5.0, 15-30% of the nickel is in an acid extractable form, and said catalyst is further characterized by having a total surface area of 170-205 m$^2$/g, a total pore volume of 0.60-0.70 cc/g, and a pore size distribution such that pores having diameters of less than 100A constitute 5.0-20.0%, pores having diameters of 100-160A constitute 70.0-80.0% and pores having diameters of greater than 250A constitute 4.0-14.0% of the total pore volume of said catalyst.

* * * * *